(12) United States Patent
Bennett

(10) Patent No.: US 8,271,865 B1
(45) Date of Patent: Sep. 18, 2012

(54) DETECTION AND UTILIZATION OF DOCUMENT READING SPEED

(75) Inventor: Victor Bennett, Berkeley, CA (US)

(73) Assignee: Google Inc., Mountain View, CA (US)

( * ) Notice: Subject to any disclaimer, the term of this patent is extended or adjusted under 35 U.S.C. 154(b) by 1490 days.

(21) Appl. No.: 11/228,213

(22) Filed: Sep. 19, 2005

(51) Int. Cl.
*G06F 17/24* (2006.01)
*G06F 17/25* (2006.01)

(52) U.S. Cl. .............................. 715/201; 715/257; 704/1

(58) Field of Classification Search .................. 235/380; 345/448, 738, 968; 358/1.15, 296, 453; 375/240.27, 375/E7.001; 434/178, 362, 365; 435/69.1; 701/1, 35, 29; 702/19; 707/2, 3, 5, 10, 100, 707/104.1; 709/201, 203, 204, 219, 221, 709/223; 713/176; 714/4; 715/234, 243, 715/274, 275, 500, 507, 526, 201, 1; 718/1
See application file for complete search history.

(56) References Cited

U.S. PATENT DOCUMENTS

| | | | |
|---|---|---|---|
| 5,796,952 A | 8/1998 | Davis et al. | |
| 5,808,466 A * | 9/1998 | Ibarrola et al. | 324/239 |
| 5,870,559 A | 2/1999 | Leshem et al. | |
| 5,873,109 A * | 2/1999 | High | 715/243 |
| 6,338,066 B1 | 1/2002 | Martin et al. | |
| 6,408,297 B1 | 6/2002 | Ohashi | |
| 6,568,939 B1 * | 5/2003 | Edgar | 434/179 |
| 6,690,365 B2 * | 2/2004 | Hinckley et al. | 345/173 |
| 6,726,487 B1 * | 4/2004 | Dalstrom | 434/178 |
| 7,458,015 B2 * | 11/2008 | Wang | 715/229 |
| 7,747,036 B2 * | 6/2010 | Kashioka | 382/100 |
| 2002/0002595 A1 | 1/2002 | Blumenau | |
| 2002/0040395 A1 | 4/2002 | Davis et al. | |
| 2002/0116421 A1 * | 8/2002 | Fox et al. | 707/526 |
| 2002/0133521 A1 * | 9/2002 | Campbell et al. | 707/526 |
| 2002/0133605 A1 | 9/2002 | Khanna et al. | |
| 2003/0003428 A1 * | 1/2003 | Dalstrom | 434/178 |
| 2004/0025111 A1 * | 2/2004 | Park | 715/500 |
| 2004/0111508 A1 | 6/2004 | Dias et al. | |
| 2004/0201619 A1 * | 10/2004 | Zervas | 345/746 |
| 2004/0253568 A1 * | 12/2004 | Shaver-Troup | 434/178 |
| 2006/0190804 A1 * | 8/2006 | Yang | 715/500 |
| 2006/0224445 A1 | 10/2006 | Axe et al. | |
| 2008/0141126 A1 * | 6/2008 | Johnson et al. | 715/273 |
| 2010/0031132 A1 * | 2/2010 | Yamaji et al. | 715/203 |

OTHER PUBLICATIONS

Campbell et al.,"A Robust Algorithm for Reading Detection", Acm, 2001, pp. 1-7.*
Copending U.S. Appl. No. 11/228,217, filed Sep. 19, 2005, "Traffic Prediction for web sites", Victor Bennett, 28 pages.

* cited by examiner

*Primary Examiner* — Doug Hutton, Jr.
*Assistant Examiner* — James Debrow
(74) *Attorney, Agent, or Firm* — Harrity & Harrity, LLP

(57) ABSTRACT

A system stores an electronic document that has markers inserted within the electronic document. The system visually renders the electronic document to a user and uses the inserted markers to determine a speed at which a reader reads the electronic document.

13 Claims, 10 Drawing Sheets

DETECTION AND UTILIZATION OF DOCUMENT READING SPEED

BACKGROUND

1. Field of the Invention

Implementations described herein relate generally to document access and retrieval and, more particularly, to detecting and utilizing a reading speed of accessed documents.

2. Description of Related Art

The advent of the global Internet and the World Wide Web ("web") has given users throughout the world the capability to quickly and easily access and retrieve information stored at remote locations. Through the web, users may access, via laptop or desktop computers at their home or business, documents stored anywhere in the world. Access of such distributed documents can produce a very large volume of traffic across the web and at specific websites on the web.

Different features associated with stored documents, such as, for example, a language, a layout, a topic, a length of text of the documents may affect the traffic across the web or at specific websites. For example, documents in different languages may require different amounts of space to say the same thing, and, thus, may require different amounts to time for a reader to read. For this reason, documents on the same topic, and even translations of the document, can take significantly longer to read in different languages. Therefore, features of a document, such as, for example, the language of the document, significantly impact user interaction with a given website that hosts the document, and by extension, impact web traffic.

SUMMARY

According to one aspect, a method may include receiving an electronic document that has markers inserted within it. The method may further include providing the electronic document to a reader and using the inserted markers to determine a speed at which the reader reads the electronic document. According to another aspect, a computer-implemented method may include selecting one or more features associated with electronic documents, where the features include at least one of a document language, a document layout, a document text length, a document topic, or a type of document content. The method may further include obtaining reading speeds associated with readers having read multiple electronic documents that included the selected features. The method may also include determining reading speed statistics associated with the selected one or more features using the obtained reading speeds.

According to a further aspect, a computer-implemented method may include aggregating reading speeds of multiple readers that have read a plurality of electronic documents. The method may further include receiving an indication of features associated with a given document, where the features include one or more of a document language, a document layout, a document text length, a document topic, or a type of document content. The method may also include using the indication of features to predict a reading speed of the given document based on the aggregated reading speeds.

According to an additional aspect, a computer-implemented method may include inserting markers in an electronic document, where the markers can be used by a client to determine a speed at which a reader reads the electronic document. The method may further include providing the electronic document to the client for visual rendering.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, reading speeds associated with documents having given features may be ascertained to aid in predicting web traffic. Determination of speeds at which readers traverse document text enables prediction of user interaction with a given website, and prediction of web traffic generally.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
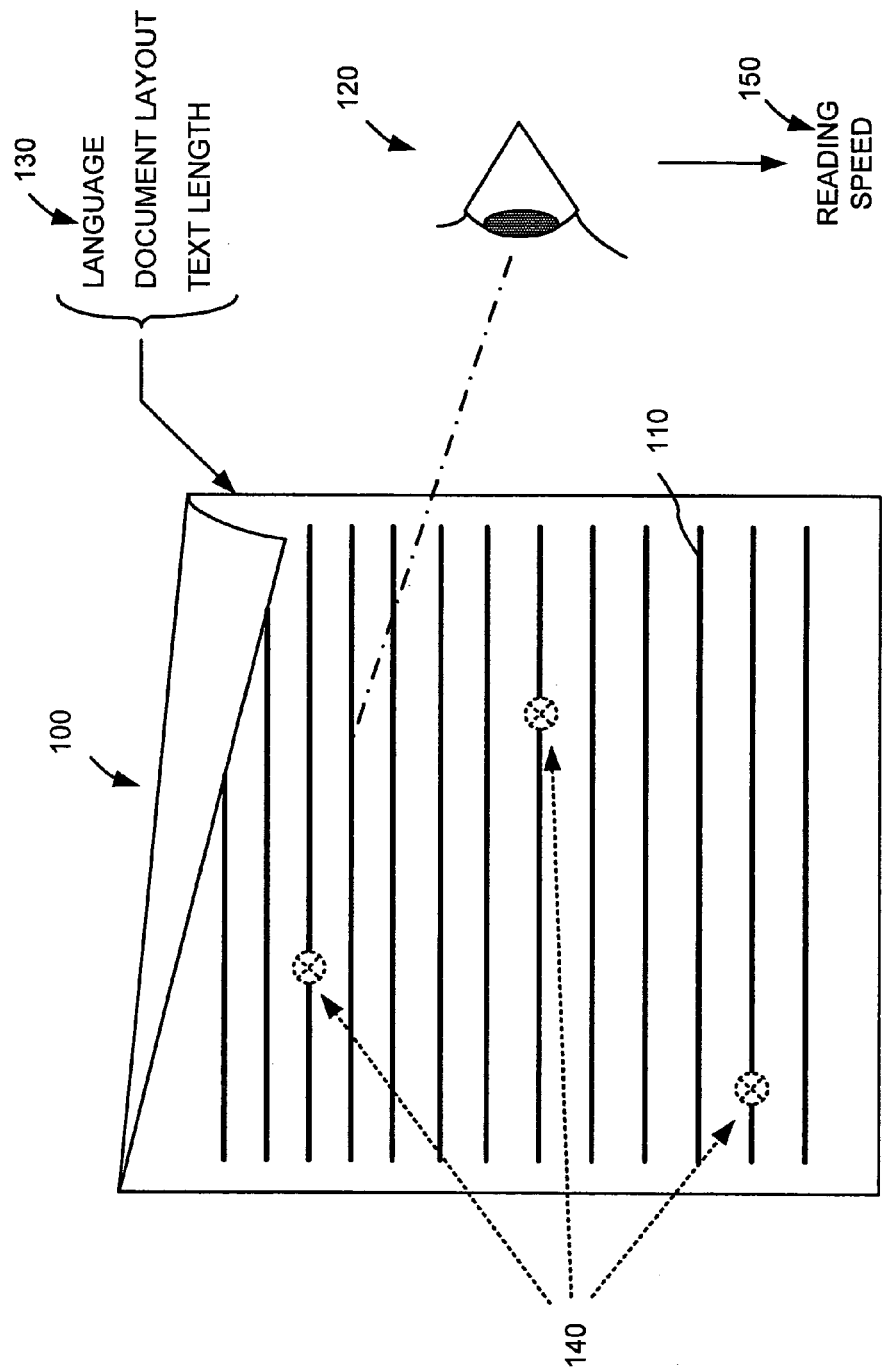
FIG. 1 is an exemplary diagram of an overview of an implementation of the invention in which a reading speed of a reader reading a document is ascertained.

FIG. 1 illustrates an exemplary overview of an implementation of the invention in which a reading speed of a user reading a document is determined using markers inserted into the document. As shown in FIG. 1, a document 100, containing a textual portion 110, may be rendered to a reader 120. Document 100 may have one or more features 130 associated with the document, such as, for example, a language of the document, a layout of the document, a text length of the document, a topic of the document, or a type of content of the document. Other types of features 130, than those described above, may be associated with document 100. Document 100 may further include one or more markers 140 inserted into the document. As reader 120 scrolls through the document, a period of time for reader 120 to read from one marker 140 to a next marker 140 may be determined so that reader 110's reading speed 150 of the document may be ascertained.

Markers 140 may include designated text or images the display of which can be detected. Markers 140 may also include a portion of code (e.g., HTML code) that reports itself when an associated portion of document 100 is visually rendered (e.g., displayed on a desktop). Markers 140 may also include a portion of a document 100 that reports a "mouse over" when a user moves a "mouse" cursor over that portion of document 100.

Exemplary Network Configuration

Figure 2:
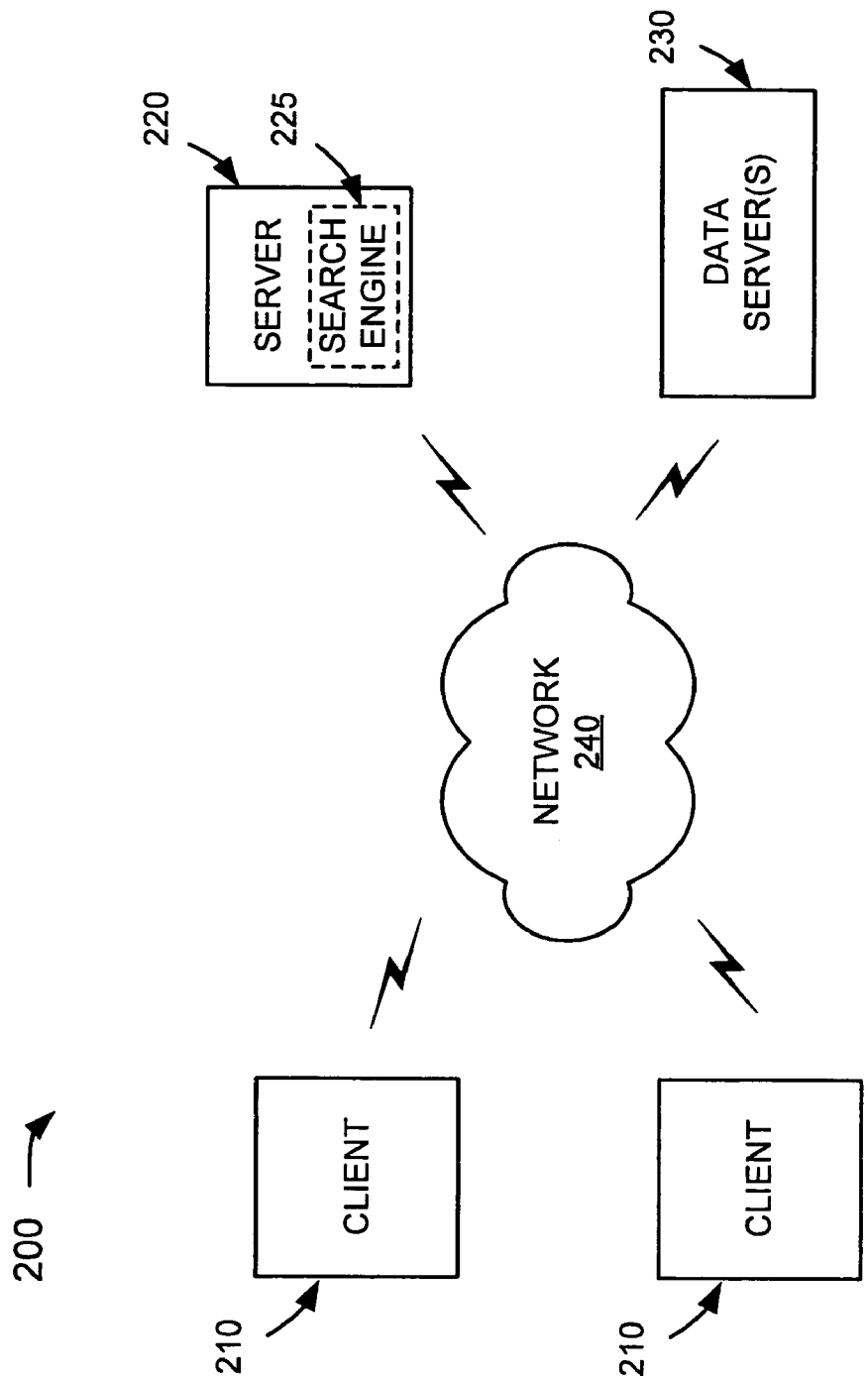
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform some functions of a server and a server may perform some functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections. Clients 210 may retrieve documents having markers from servers 220 or 230, and may use the markers inserted into the retrieved documents to determine a document reading speed of a user reading the retrieved documents, as described below with respect to FIG. 4. In some implementations, clients 210 may use the reading speeds determined in the exemplary process of FIG. 4 to determine document reading speed statistics, as described with respect to FIG. 7 below, and to predict reading speeds of other documents, as described with respect to FIG. 9 below.

In an implementation consistent with the principles of the invention, server 220 may include a search engine system 225 usable by users at clients 210. Server 220 may implement a data aggregation service by crawling a corpus of documents (e.g., web documents), indexing the documents, and storing information associated with the documents in a repository of documents. The data aggregation service may be implemented in other ways, such as by agreement with the operator(s) of data server(s) 230 to distribute their hosted documents via the data aggregation service. Search engine system 225 may execute a search, received from a user at a client 210, on the corpus of documents stored in the repository of documents. Server 220 may receive reading speeds associated with documents read by users at clients 210, and, in some implementations, may use the received reading speeds to determine document reading speed statistics, as described with respect to FIG. 7 below, and to predict reading speeds of other documents, as described with respect to FIG. 9 below.

Server(s) 230 may store or maintain documents that may be crawled by server 220. Such documents may include data related to published news stories, products, images, user groups, geographic areas, or any other type of data. For example, server(s) 230 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites. Server 230 may receive reading speeds associated with documents read by users at clients 210, and, in some implementations, may use the received reading speeds to determine document reading speed statistics, as described with respect to FIG. 7 below, and to predict reading speeds of other documents, as described with respect to FIG. 9 below.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Exemplary Client/Server Architecture

Figure 3:
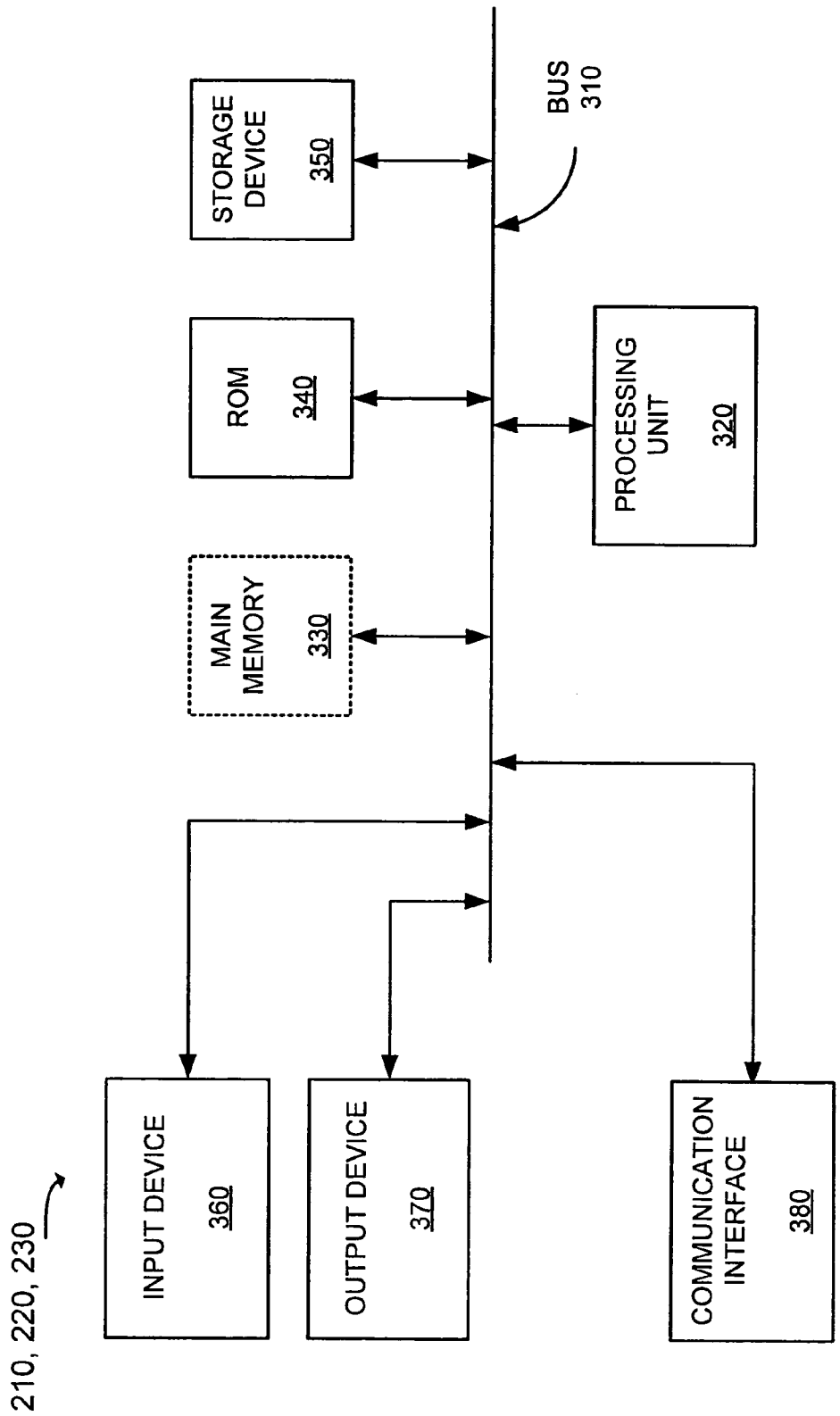
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Document Reading Speed Determination Process

Figure 4:
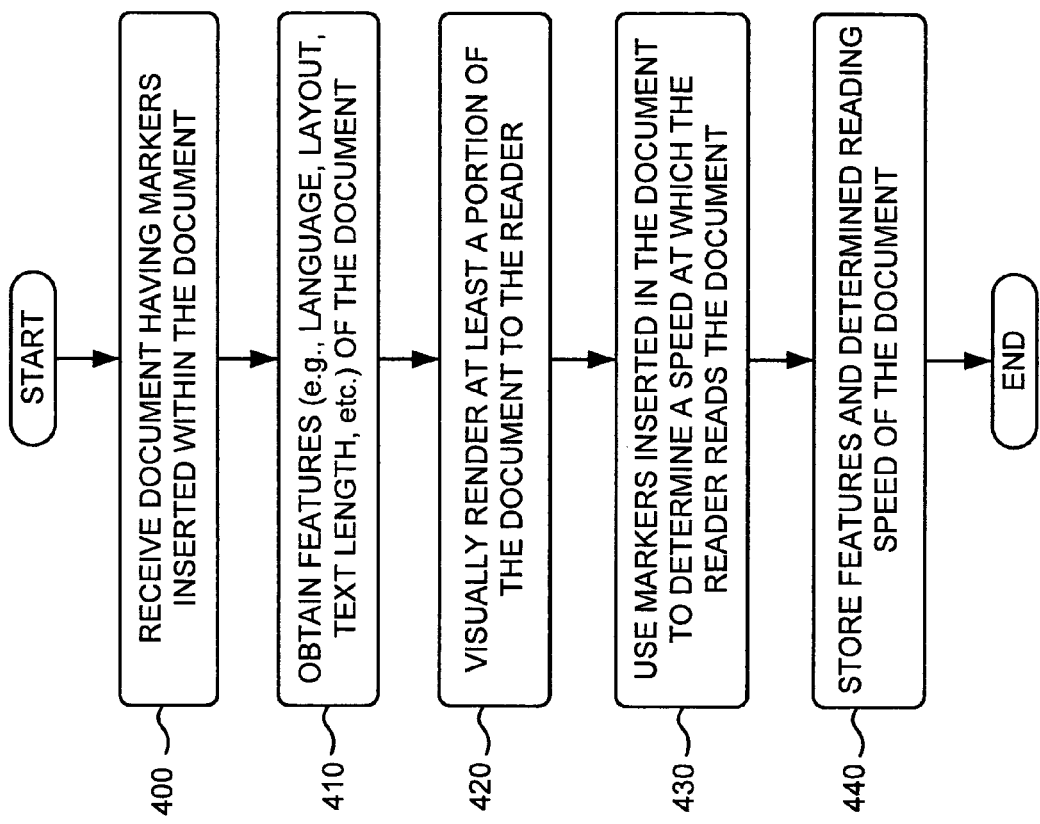
FIG. 4 is a flowchart of an exemplary process for determining a reading speed of a user reading a document that includes markers inserted within the document consistent with principles of the invention.

FIG. 4 is a flowchart of an exemplary process for determining a reading speed of a document that includes markers inserted within the document. The process exemplified by FIG. 4 may be implemented by client 210 (e.g., by a browser implemented at client 210).

The exemplary process may begin with the receipt of a document having markers inserted within the document (block 400). The markers may be inserted into the document automatically by data server 230, or manually by an operator associated with data server 230, prior to being sent to client 210. The document may be received by a client 210 from data server 230 via network 240. The markers may include designated text or images the display of which can be detected. The markers may also include a portion of code (e.g., HTML code) that reports itself (e.g., to a web browser implemented at client 210) when an associated portion of the document is visually rendered at client 210 (e.g., a user at client 210 scrolls through the document using a web browser scroll bar). The markers may also include a portion of the document that reports (e.g., to the web browser implemented at client 210) a "mouse over" when a user moves a "mouse" cursor over that portion of the document. A web browser implemented at client 210 may visually render the received document and may detect the presence of the markers within the document as associated portions of the document are visually rendered, or as the user moves the "mouse" cursor over the portions of the document.

Features of the document may be obtained (block 410). The features of the document may include, but are not limited to, language, layout, text length, topic, content type, etc. The features may be determined by analysis of the content of the document, such as, for example, analysis of formatting code (e.g., html formatting code) associated with the document, or analysis of text contained within the document. The language feature of the document may be determined, for example, using a dictionary of words in different languages. Words in the textual portion of the document may be compared with the dictionary of words in different languages to identify the language of the document.

Figure 5:
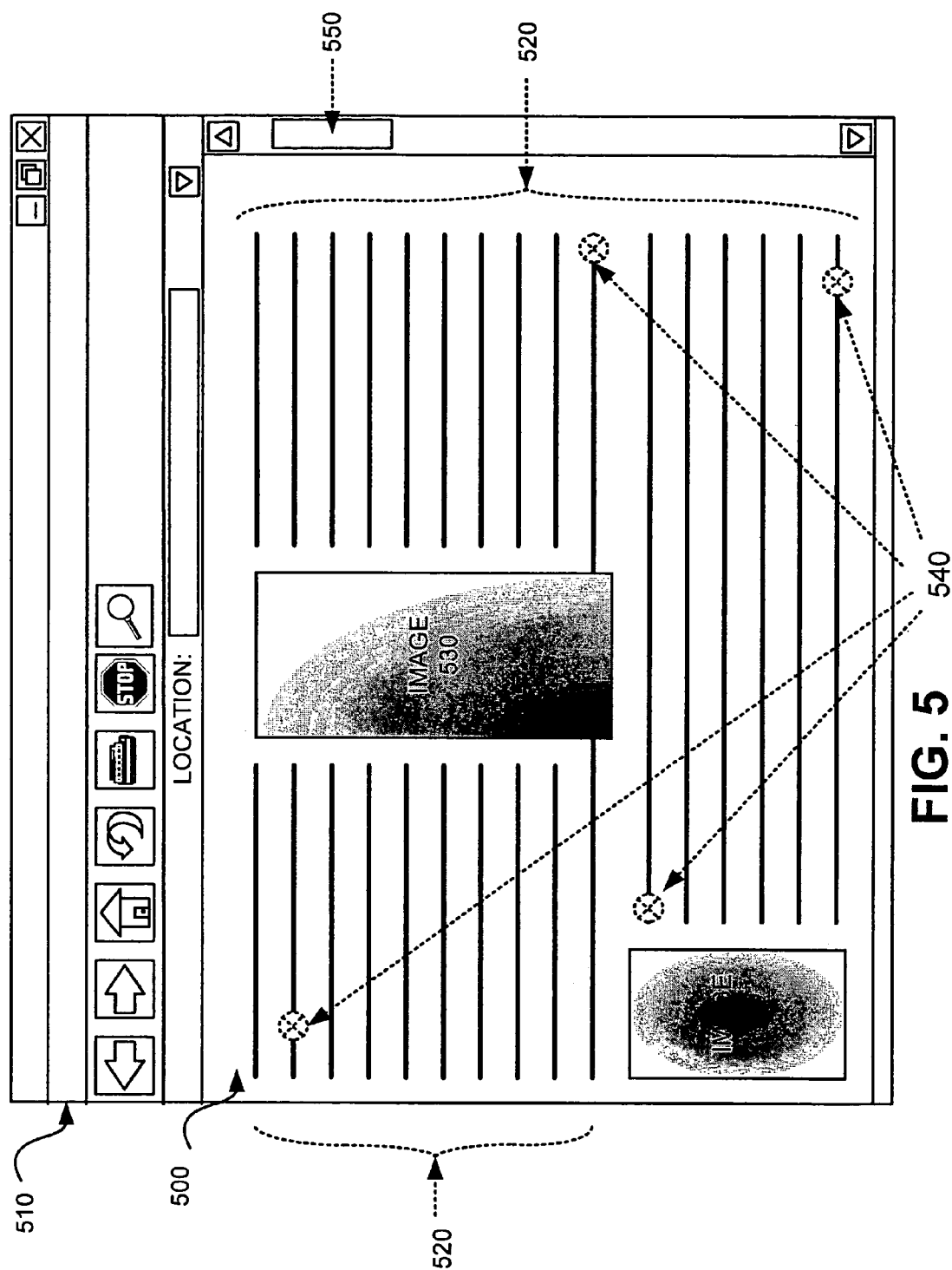
FIG. 5 is a diagram of an exemplary document having markers consistent with principles of the invention.

At least a portion of the document may be visually rendered to the reader (block 420). A web browser implemented at client 210 may visually render at least a portion of the document. FIG. 5 illustrates an exemplary document 500 visually rendered by a web browser 510. As shown in FIG. 5, document 500 may include textual portions 520, one or more images 530, and markers 540 inserted within the content of document 500.

The markers inserted into the document may be used to determine a speed at which the reader reads the document (block 430). As the user reads through the document (i.e., scrolling through the document, or moving the "mouse" cursor over the document), an interval of time between each marker may be noted and used to determine a speed at which the user is reading through that portion of the document. For example, if designated text or images are used as markers, as the user scrolls through the document and the designated text or images are detected, an interval of time between detection of each designated text or images may be determined. As another example, if the markers include a portion of code that reports itself when an associated portion of the document is visually rendered, as the user scrolls through the document and the portions of the document associated with the markers are visually rendered, an interval of time between each code report may be determined. As a further example, if the markers include a portion of the document that reports a "mouse over" when a user moves a "mouse" cursor over that portion of the document, an interval of time may be determined between each reported "mouse over." The intervals of time between markers may further be related to the amount of text contained in the portion of the document so that a reading speed in terms of words per period of time (e.g., number of words/minute, etc.) may be determined.

Returning to FIG. 5, as portions of document 500 are visually rendered by browser 510 as a user scrolls through document 500 using, for example, browser scroll bar 550, markers 540 may be detected and the intervals between detection of markers 540 may further be determined to ascertain a reading speed associated with document 500.

Figure 6:
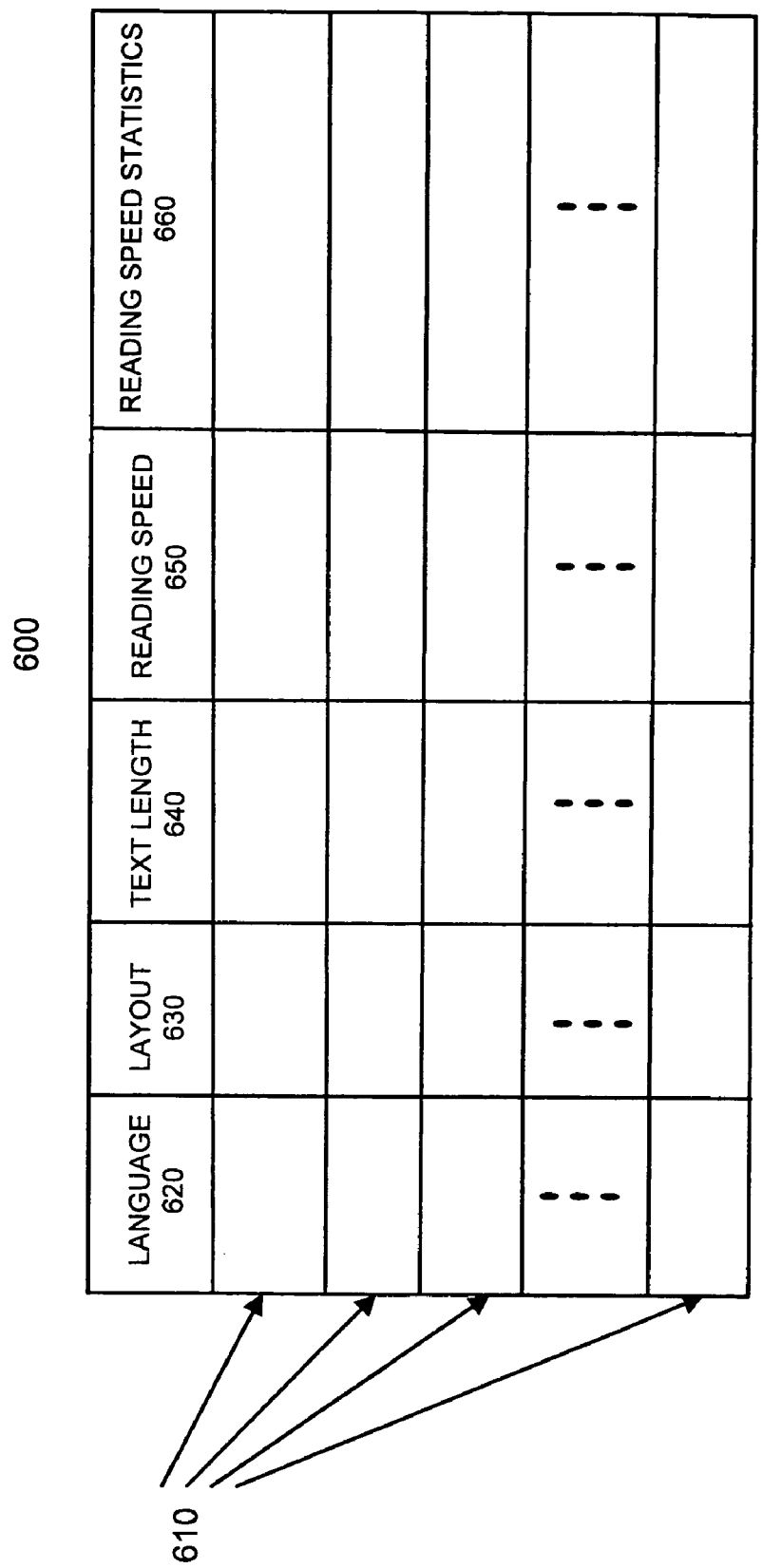
FIG. 6 is a diagram of an exemplary data structure for storing document features and reading speeds consistent with principles of the invention.

The features of the document, and the determined reading speed, may be stored (block 440). The document features and determined reading speed may be stored in, for example, a data structure, such as data structure 600 shown in FIG. 6. As shown in FIG. 6, data structure 600 may include multiple entries 610, with each entry 610 having associated feature fields (e.g., language field 620, layout field 630, text length field 640) and a reading speed field 650 associated with a document. Each entry 610 may optionally include a document identifier field (not shown) that may store a unique identifier (e.g., a uniform resource locator (URL)) associated with the document that was read by a reader. The features of the document and the determined reading speed may be stored at client 210 or may be reported to a server (e.g., server 220 or server 230) where they may be stored in data structure 600. If the features of the document and the determined reading speed are stored at client 210 in data structure 600, then the contents of data structure 600 may be sent to the server 220 or 230 that may, in some implementations, perform the processes described below with respect to FIGS. 7 and 9.

Exemplary Reading Speed Statistics Determination Process

Figure 7:
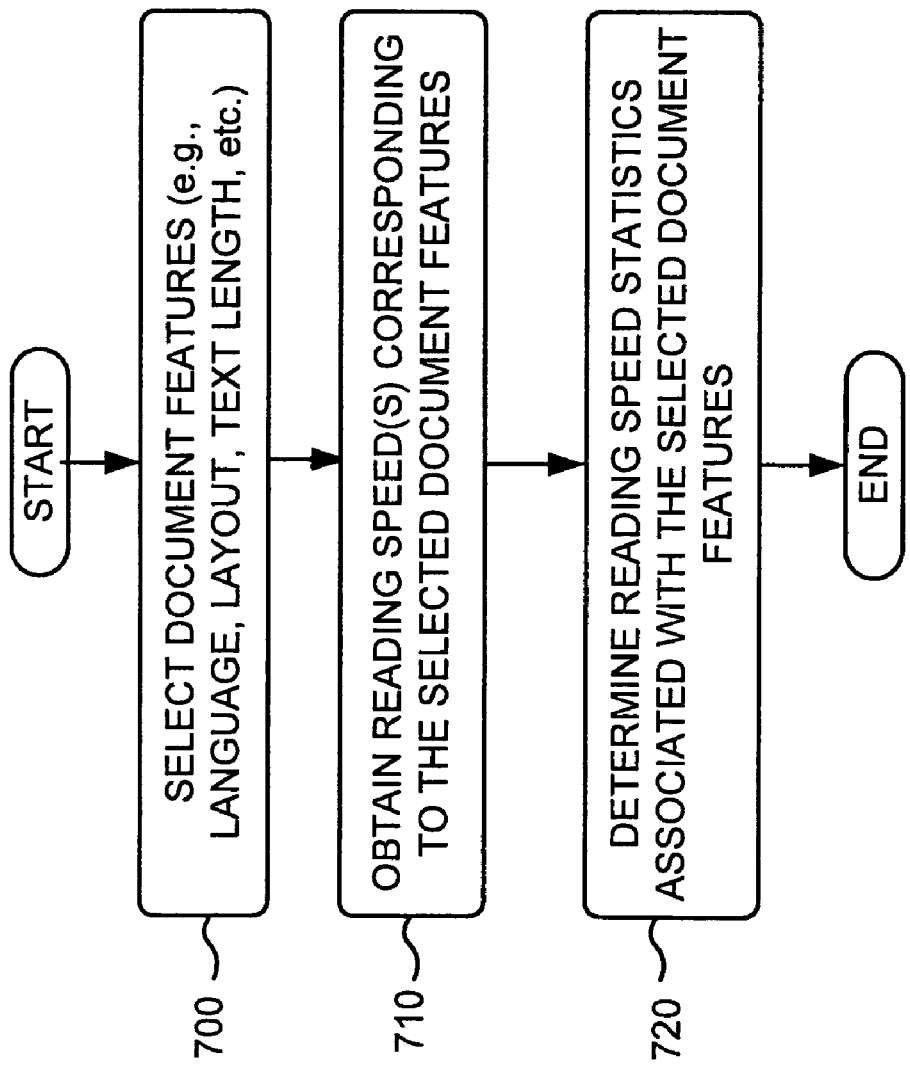
FIG. 7 is a flowchart of an exemplary process for determining reading speed statistics associated with one or more documents consistent with principles of the invention.

FIG. 7 is a flowchart of an exemplary process for determining reading speed statistics associated with one or more documents. The process exemplified by FIG. 7 may be implemented by a client 210, or by servers 220 or 230.

Figure 8:
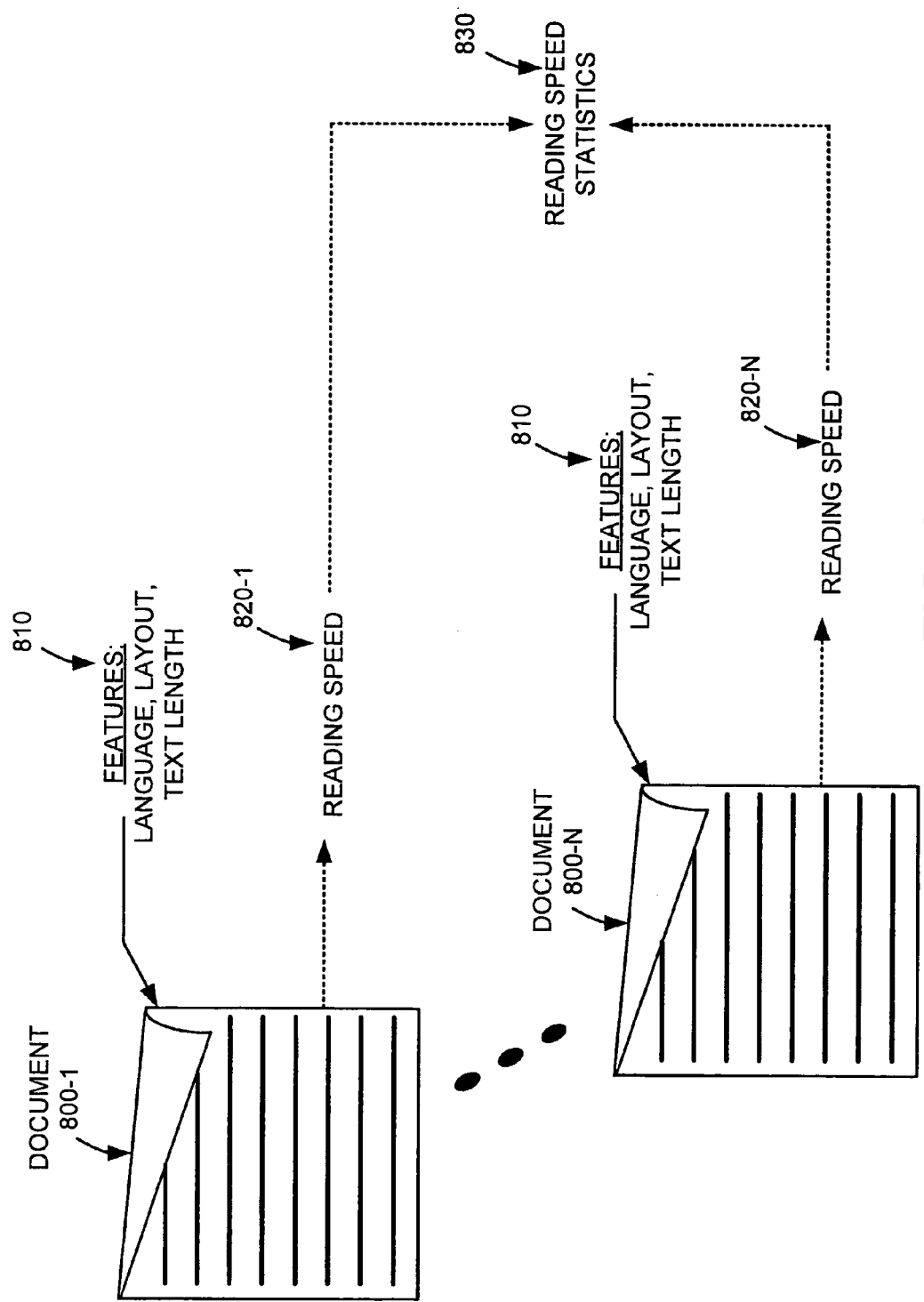
FIG. 8 is a diagram that graphically illustrates the determination of reading speed statistics consistent with principles of the invention.

The exemplary process may begin with the selection of document features (block 700). The features may include, but are not limited to, a document language, document layout, document text length, document topic or a content type of the document. The document features may be selected based on the statistical analysis that is desired to be performed. For example, the statistical analysis may be performed based on a dependent variable and an independent variable. As one example, the independent variable may be types of document content, and the dependent variable may be reading speed. The purpose of the statistical analysis may be to determine reading speed statistics as a function of types of document. As another example, the independent variable may be the same document in different languages, and the dependent variable may be reading speed. The purpose of the statistical analysis may be to determine reading speed for the document as a function of a language of the document. As a further example, the independent variable may be different types of content in a similar format (e.g., a news source may include sports, fashion and news documents all in a similar format) and the dependent variable may be the reading speed. The purpose of the statistical analysis may be to determine reading speed as a function of the different types of content that are in a similar format. As shown in FIG. 8, features 810, that correspond to features of one or more documents 800-1 through 800-N, may be selected based on the desired type of statistical analysis to be performed.

Reading speeds corresponding to the selected document features may be obtained (block 710). The reading speeds may be obtained, for example, from data structure 600. As shown in FIG. 6, reading speeds 650 of entries 610 that have features (e.g., language 620, layout 630, text length 640) that match the selected document features may be retrieved from data structure 600. As further shown in FIG. 8, reading speeds 820-1 through 820-N corresponding to the selected features 810 may be obtained.

Reading speed statistics associated with the selected document features may be determined (block 720). For example, an average reading speed distribution may be determined using the reading speeds obtained in block 710. As a specific example, an average reading speed distribution may be determined as a function of types of document. As another specific example, an average reading speed distribution may be determined as a function of a document in different languages. As a further specific example, an average reading speed distribution may be determined as a function of different types of content in a similar format. As shown in FIG. 8, reading speed statistics 830 may be determined using the obtained reading speeds 820-1 through 820-N. The determined reading speed statistics may be stored in a field 660 (FIG. 6) of each entry 610 having features (e.g., language 620, layout 630, text length 640) that match the selected document features.

Exemplary Reading Speed Prediction Process

Figure 9:
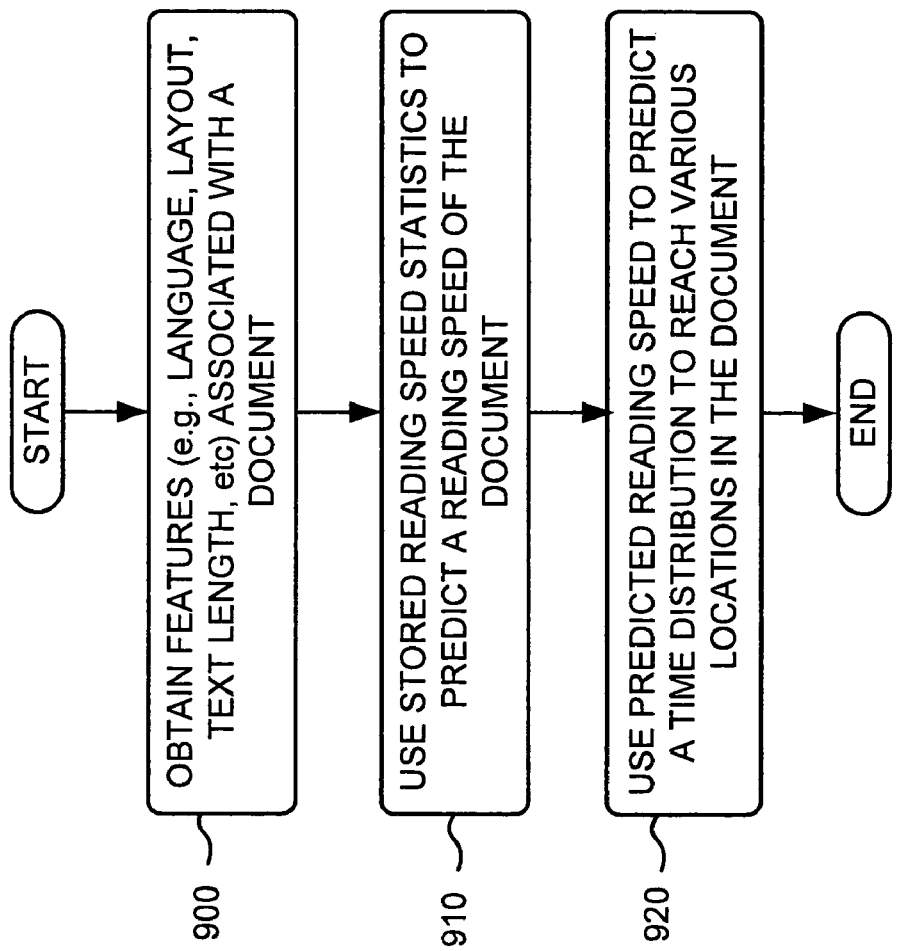
FIG. 9 is a flowchart of an exemplary process for predicting a document reading speed consistent with principles of the invention.

FIG. 9 is a flowchart of an exemplary process for predicting a document reading speed consistent with principles of the invention. The process exemplified by FIG. 9 may be implemented by a client 210, or by servers 220 or 230.

Figure 10:
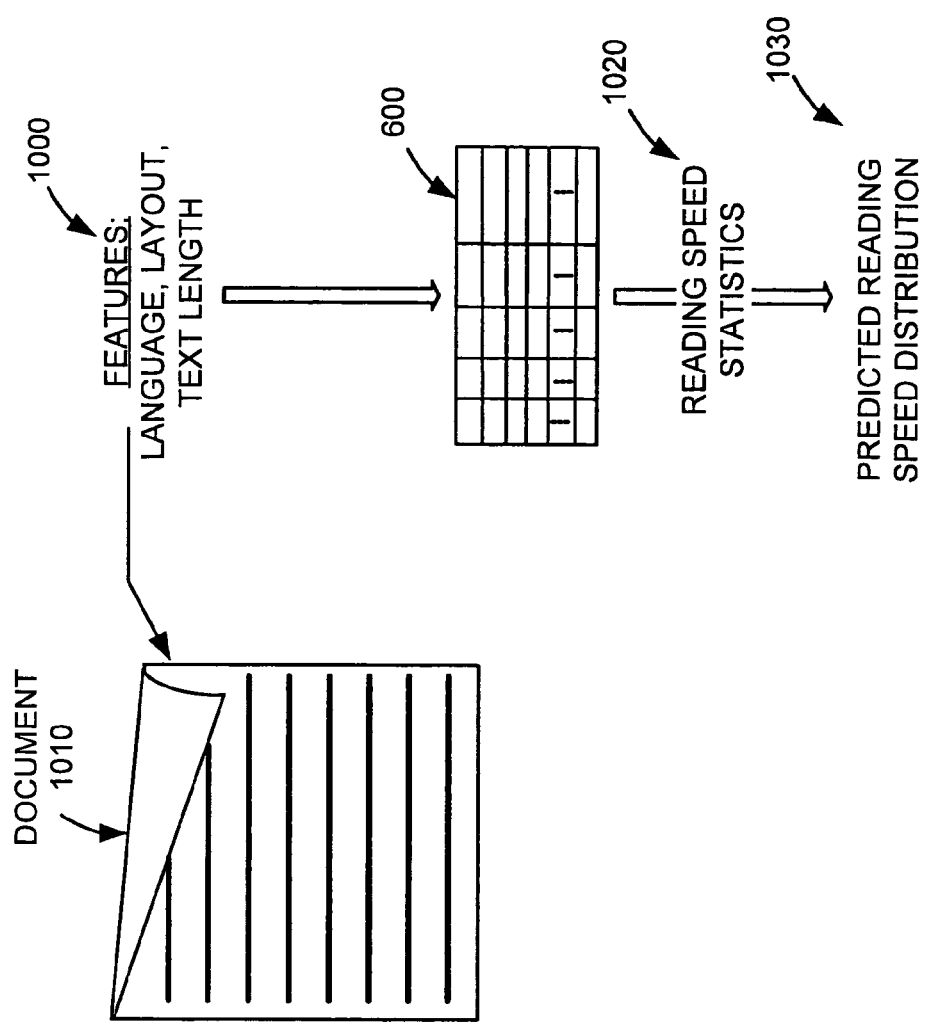
FIG. 10 is a diagram that graphically illustrates the process of FIG. 9.

The exemplary process may begin with obtaining features associated with a given document the reading speed of which is desired to be predicted (block 900). The features may include, but are not limited to, a language of the document, a layout of the document, a length of text in the document, etc. As shown in FIG. 10, features 1000 associated with a document 1010, whose reading speed is desired to be predicted, may be obtained.

Stored reading speed statistics may be used to predict a reading speed of the document (block 910). For example, reading speed statistics 660 (FIG. 6) from entries 610 of data structure 600 whose features (e.g., language 620, layout 630, text length 640) match the obtained features of the document may be retrieved and used to predict a reading speed distribution of the document. The stored reading speed statistics may, for example, be used to predict a reading speed distribution (a statistical distribution of reading speeds given the document features). As shown in FIG. 10, the obtained features 1000 may be used to retrieve reading speed statistics 1020 from data structure 600, and the reading speed statistics 1020 may be used to predict a reading speed distribution 1030.

The predicted reading speed may be used to further predict a time distribution to reach various locations in the document (block 920). For example, given a predicted reading speed distribution, a corresponding time distribution may be derived that can be used to predict when a given document reader may reach various locations in the document. Thus, the predicted reading speed may be used to determine an expected time after a document is loaded by a browser that a user will reach a specific portion of the document.

Conclusion

Systems and methods consistent with principles of the invention permit the determination of reading speeds of documents. The determined reading speeds may be used, for example, to determine an expected time after loading of a document by a browser that a user will reach a specific portion of the document. The determined reading speeds may further be used to differentiate users who speak the language they are reading from those that don't, and may also be used to detect automated surfing systems from actual users that are reading a document.

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while a series of acts has been described with regard to FIGS. 4, 7 and 9, the order of the acts may be modified in other implementations consistent with the principles of the invention. Further, non-dependent acts may be performed in parallel. Aspects of the invention may be used to determine how long video segments should be to accommodate text in closed captioning applications, to determine the length of portions of text in slideshow presentations (e.g., powerpoint presentations), to determine whether a user has read a given page (e.g., DMV automated traffic school, contracts, etc.), or to detect and avoid "bots" and automated surfing on "pay-per-click" web pages). Reading speed predictions, as described above with respect to FIG. 9, may be based on only a single user rather than being aggregated across many users.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method, comprising:
   receiving, by a processor of a computer, a selection of one or more features associated with a first electronic document, where the selected one or more features include at least one of:
      a language associated with the first electronic document,
      a layout associated with the first electronic document,
      a text length associated with the first electronic document,
      a topic associated with the first electronic document, or
      a type of content associated with the first electronic document;
   obtaining, by a processor of the computer, a first reading speed associated with the first electronic document, the obtaining of the first reading speed including:
      accessing a data structure storing a plurality of reading speeds for a respective plurality of electronic documents, a plurality of features being associated with the plurality of electronic documents,
      identifying one of the plurality of electronic documents that is associated with selected one or more features, and
      identifying, as the first reading speed, one of the plurality of reading speeds that is associated with the identified one of the plurality of electronic documents;
   determining, by the processor of the computer, reading speed statistics associated with the selected one or more features using the obtained first reading speed; and
   estimating, by the processor of the computer, a second reading speed associated with a second electronic document, that includes the selected one or more features, based on the first reading speed and the determined reading speed statistics.

2. The method of claim 1, where estimating the second reading speed of the second electronic document includes:
   modifying the first reading speed based on the determined reading speed statistics.

3. The method of claim 1, where determining the first reading speed statistics comprises:
   determining an average reading speed distribution as a function of the selected one or more features.

4. The method of claim 1, where the first reading speed and the second reading speed are associated with a particular user.

5. A system, comprising:
   a memory to store a data structure that includes plurality of reading speeds for a respective plurality of electronic documents, a plurality of features being associated with the plurality of electronic documents; and
   a processing unit to:
      receive an indication of one or more features, of the plurality of features, associated with a first electronic document, where the one or more features associated with the first electronic document include one or more of:
         a document language,
         a document layout,
         a document text length,
         a document topic, or
         a type of document content,
      calculate a first reading speed associated with the first electronic document, the processing unit, when calculating the first reading speed, being further to:
         determine one of the plurality of electronic documents that includes the one or more features, and
         identify, as the first reading speed, one of the plurality of reading speeds that is associated with the determined one of the plurality of electronic documents,
      determine, based on the first reading speed, one or more reading speed statistics associated with the one or more features associated with the first electronic document, and
      predict a second reading speed of a second electronic document based on the first reading speed and the one or more reading speed statistics.

6. The device of claim 5, where the processor, when estimating the second reading speed of the second electronic document, is further to:
   modify the first reading speed based on the determined reading speed statistics.

7. The device of claim 5, where the processing unit, when determining the one or more reading speed statistics, is further to:
   determine an average reading speed distribution as a function of the one or more features.

8. The device of claim 5, where the first reading speed and the second reading speed are associated with a particular user.

9. A system, comprising:
   one or more devices comprising:
      means for receiving an indication of features associated with a first electronic document, where the features include one or more of a document language, a document layout, a document text length, a document topic, or a type of document content;
      means for identifying a first reading speed associated with the first electronic document, the identifying means including:
         means for accessing a data structure storing a plurality of reading speeds for a respective plurality of electronic documents, a plurality of features being associated with the plurality of electronic documents,
         means for identifying one of the plurality of electronic documents that is associated with features for the first electronic document, and
         means for identifying, as the first reading speed, one of the plurality of reading speeds that is associated with the identified one of the plurality of electronic documents;
      means for determining reading speed statistics, associated with the features associated with the first electronic document, using the first reading speed;

means for estimating a second reading speed, associated with a second electronic document, based on the first reading speed and the reading speed statistics.

10. A non-transitory computer-readable medium comprising:
- one or more instructions which, when executed by a processor, cause the processor to receive an indication of one or more features associated with the first electronic document, where the one or more features associated with the first electronic document include one or more of:
  - a document language,
  - a document layout,
  - a document text length,
  - a document topic, or
  - a type of document content;
- one or more instructions which, when executed by the processor, cause the processor to obtain a first reading speed associated with the first electronic document, the one or more instruction to obtain the first reading speed including:
  - one or more instructions to access a data structure storing a plurality of reading speeds for a respective plurality of electronic documents, a plurality of features being associated with the plurality of electronic documents,
  - one or more instructions to identify one of the plurality of electronic documents that is associated with features for the first electronic document, and
  - one or more instructions to identify, as the first reading speed, one of the plurality of reading speeds that is associated with the identified one of the plurality of electronic documents;
- one or more instructions which, when executed by the processor, cause the processor to determine, based on the first reading speed, one or more reading speed statistics associated with the one or more features associated with the first electronic document; and
- one or more instructions which, when executed by the processor, cause the processor to predict a second reading speed of a second electronic document based on the first reading speed and the one or more reading speed statistics.

11. The computer readable of claim 10, where the one or more instructions to estimate the second reading speed of the second electronic document further include:
- one or more instructions to modify the first reading speed based on the determined reading speed statistics.

12. The computer readable of claim 10, where the one or more instructions to determine the one or more reading speed statistics further include:
- one or more instructions to determine an average reading speed distribution as a function of the one or more features.

13. The computer readable of claim 10, where the first reading speed and the second reading speed are associated with a particular user.

* * * * *